US011428290B2

(12) United States Patent
Ueki et al.

(10) Patent No.: US 11,428,290 B2
(45) Date of Patent: Aug. 30, 2022

(54) VIBRATION ISOLATING DEVICE

(71) Applicant: PROSPIRA CORPORATION, Kawasaki (JP)

(72) Inventors: Akira Ueki, Tokyo (JP); Yuki Satake, Tokyo (JP); Yuta Baba, Tokyo (JP)

(73) Assignee: Prospira Corporation, Kawasaki (JP)

( * ) Notice: Subject to any disclaimer, the term of this patent is extended or adjusted under 35 U.S.C. 154(b) by 119 days.

(21) Appl. No.: 16/956,734

(22) PCT Filed: Dec. 6, 2018

(86) PCT No.: PCT/JP2018/044920
§ 371 (c)(1),
(2) Date: Jun. 22, 2020

(87) PCT Pub. No.: WO2019/131043
PCT Pub. Date: Jul. 4, 2019

(65) Prior Publication Data
US 2020/0400210 A1    Dec. 24, 2020

(30) Foreign Application Priority Data

Dec. 26, 2017 (JP) .............................. JP2017-249883

(51) Int. Cl.
*F16F 13/10* (2006.01)
(52) U.S. Cl.
CPC ............ *F16F 13/107* (2013.01); *F16F 13/10* (2013.01)
(58) Field of Classification Search
CPC ........ F16F 13/00; F16F 13/107; F16F 13/106; F16F 13/18; F16F 13/06; B60K 5/00;
(Continued)

(56) References Cited

U.S. PATENT DOCUMENTS 4,903,951 A    2/1990 Miyamoto et al.
5,028,038 A *  7/1991 de Fontenay ......... F16F 13/262
                                                        180/312
(Continued)

FOREIGN PATENT DOCUMENTS

CN    203082111 U    7/2013
CN    104302942 A    1/2015
(Continued)

OTHER PUBLICATIONS

International Search Report dated Feb. 26, 2019 in International Application No. English PCT/JP2018/044920.
(Continued)

*Primary Examiner* — Robert A. Siconolfi
*Assistant Examiner* — Mahbubur Rashid
(74) *Attorney, Agent, or Firm* — Kenja IP Law PC

(57) ABSTRACT

The invention is a liquid filled type vibration isolating device (10) which includes a partition member (16) that partitions a liquid chamber (19) within a first attachment member (11) filled with a liquid into a first liquid chamber (14) and a second liquid chamber (15), and in which a restricted passage (24), which is configured to allow the first liquid chamber and the second liquid chamber to communicate with each other, is formed in the partition member. The restricted passage includes a first communication part (26) opening to the first liquid chamber, a second communication part opening to the second liquid chamber, and a main flow passage (25) that allows the first communication part and the second communication part to communicate with each other. At least one of the first communication part and the second communication part includes a plurality of pores (26a) that penetrate a first barrier (38) facing the first liquid chamber or the second liquid chamber. At least one pore of the plurality of pores has a flow passage length of the (Continued)

pore that is 3 times or more the minimum value of the internal diameter of the pore.

3 Claims, 3 Drawing Sheets

(58) Field of Classification Search
CPC .. B60K 5/12; B60G 13/00; F15D 1/00; B64D 47/00
See application file for complete search history.

(56) References Cited

U.S. PATENT DOCUMENTS

| | | | | |
|---|---|---|---|---|
| 5,499,799 | A * | 3/1996 | Kojima | F16F 13/107 267/140.13 |
| 6,622,995 | B2 * | 9/2003 | Baudendistel | F16F 13/305 267/140.14 |
| 8,308,147 | B2 * | 11/2012 | Kojima | F16F 13/18 267/140.13 |
| 8,894,051 | B2 * | 11/2014 | Yamamoto | F16F 13/106 267/140.13 |
| 9,719,576 | B2 | 8/2017 | Nagasawa et al. | |
| 9,726,251 | B2 | 8/2017 | Nagasawa et al. | |
| 9,772,002 | B2 * | 9/2017 | Ueki | F16F 13/107 |
| 9,816,580 | B2 * | 11/2017 | Hayashi | F16F 13/106 |
| 9,897,160 | B2 * | 2/2018 | Nishikawa | F16F 13/107 |
| 10,480,607 | B2 | 11/2019 | Nagasawa et al. | |
| 2002/0047080 | A1 * | 4/2002 | Guillemot | F16F 13/107 248/562 |
| 2004/0119215 | A1 | 6/2004 | Nanno et al. | |
| 2006/0066016 | A1 | 3/2006 | Hasegawa et al. | |
| 2006/0071381 | A1 | 4/2006 | Hatakeyama et al. | |
| 2006/0220287 | A1 | 10/2006 | Muramatsu et al. | |
| 2006/0267259 | A1 | 11/2006 | Hatakeyama et al. | |
| 2011/0210488 | A1 * | 9/2011 | Yamamoto | F16F 13/106 267/140.13 |
| 2012/0248669 | A1 * | 10/2012 | Masuda | F16F 13/106 267/140.13 |
| 2014/0339035 | A1 | 11/2014 | Breida et al. | |
| 2015/0123327 | A1 | 5/2015 | Saito et al. | |
| 2015/0369327 | A1 | 12/2015 | Furumachi et al. | |
| 2016/0053845 | A1 | 2/2016 | Ueki et al. | |
| 2016/0053846 | A1 | 2/2016 | Nagasawa et al. | |
| 2016/0298716 | A1 | 10/2016 | Ueki | |
| 2017/0002891 | A1 * | 1/2017 | Nishikawa | F16F 13/107 267/140.13 |
| 2018/0073591 | A1 | 3/2018 | Nagasawa et al. | |
| 2019/0107171 | A1 | 4/2019 | Ueki et al. | |
| 2019/0145488 | A1 | 5/2019 | Ueki et al. | |
| 2019/0176605 | A1 | 6/2019 | Ueki et al. | |

FOREIGN PATENT DOCUMENTS

| | | | | |
|---|---|---|---|---|
| CN | 105705825 | A | 6/2016 | |
| CN | 106574682 | A | 4/2017 | |
| CN | 107366710 | A | 11/2017 | |
| DE | 20 2014 102 292 | U1 | 8/2014 | |
| EP | 1 923 598 | A1 | 5/2008 | |
| EP | 3 477 146 | A1 | 5/2019 | |
| FR | 2 898 647 | A1 | 9/2007 | |
| JP | 63-280943 | A | 11/1988 | |
| JP | 1-224544 | A | 9/1989 | |
| JP | 2003-294078 | A | 10/2003 | |
| JP | 2004-190757 | A | 7/2004 | |
| JP | 2004-316895 | A | 11/2004 | |
| JP | 2006-97824 | A | 4/2006 | |
| JP | 2006-258217 | A | 9/2006 | |
| JP | 2012-26510 | A | 2/2012 | |
| JP | 2015-218843 | A | 12/2015 | |
| JP | 2016-8643 | A | 1/2016 | |
| JP | 2018-115713 | A | 7/2018 | |
| JP | 2018-119621 | A | 8/2018 | |
| JP | 2018-194101 | A | 12/2018 | |
| WO | 2004/090374 | A1 | 10/2004 | |
| WO | WO-2014196382 | A1 * | 12/2014 | ............ F16F 13/107 |
| WO | WO-2015156201 | A1 * | 10/2015 | ........... B60K 5/1208 |
| WO | 2016/027606 | A1 | 2/2016 | |
| WO | 2016/147698 | A1 | 9/2016 | |
| WO | 2017/221816 | A1 | 12/2017 | |
| WO | 2018/193895 | A1 | 10/2018 | |
| WO | 2018/198442 | A1 | 11/2018 | |
| WO | 2018/198444 | A1 | 11/2018 | |
| WO | 2018/211754 | A1 | 11/2018 | |
| WO | 2019/117062 | A1 | 6/2019 | |
| WO | 2019/131649 | A1 | 7/2019 | |

OTHER PUBLICATIONS

Extended European Search Report dated Sep. 21, 2021 in European Application No. 18896811.9.
Search Report dated Apr. 21, 2021 in Chinese Application No. 201880084011.9.

* cited by examiner

VIBRATION ISOLATING DEVICE

CROSS-REFERENCE TO RELATED APPLICATIONS

This application is a National Stage of International Application No. PCT/JP2018/044920 filed on Dec. 6, 2018, which claims priority under U.S.C. § 119(a) to Japanese Patent Application No. JP2017-249883 filed on Dec. 26, 2017, the disclosure of which is incorporated herein in its entirety by reference.

TECHNICAL FIELD

The present invention relates to a vibration isolating device that is applied to, for example, an automobile, an industrial machine, etc., and damps and absorbs the vibration of a vibration generating part such as an engine.

Priority is claimed on Japanese Patent Application No. 2017-249883, filed Dec. 26, 2017, the content of which is incorporated herein by reference.

BACKGROUND ART

From the past, there has been known a liquid filled type vibration isolating device including a tubular first attachment member that is coupled to any one of a vibration generating part and a vibration receiving part and a second attachment member that is coupled to the other thereof; an elastic body that elastically couples both the attachment members to each other; and a partition member that partitions a liquid chamber within the first attachment member filled with a liquid into a first liquid chamber and a second liquid chamber. A restricted passage, which allows the first liquid chamber and the second liquid chamber to communicate with each other, is formed in the partition member. The restricted passage includes a first communication part opening to the first liquid chamber, a second communication part opening to the second liquid chamber, and a main flow passage that allows the first communication part and the second communication part to communicate with each other.

As this type of vibration isolating device, for example, as shown in the following Patent Document 1, a configuration is known in which any one of the first communication part and the second communication part includes a plurality of pores that penetrate a first barrier facing the first liquid chamber or the second liquid chamber. In the vibration isolating device, when a large load (vibration) is input and the first liquid chamber or the second liquid chamber has a negative pressure rapidly, even if air bubbles are generated within the main flow passage, the air bubbles are made to pass through the plurality of pores. Accordingly, it is possible to finely split the air bubbles to disperse the air bubbles to the first liquid chamber or the second liquid chamber, and the abnormal noise to be generated can be kept low even if cavitation collapse in which the air bubbles collapse occurs.

CITATION LIST

Patent Document

[Patent Document 1] PCT International Publication No. WO2016/027606

DISCLOSURE OF INVENTION

Technical Problem

However, in the related-art vibration isolating device, when the first liquid chamber or the second liquid chamber has a negative pressure rapidly, there is a possibility that a flow velocity difference is caused between the liquid which has flowed into the first liquid chamber or the second liquid chamber from the restricted passage through the plurality of pores, and the liquid within the first liquid chamber or the second liquid chamber, and air bubbles are generated within the first liquid chamber or the second liquid chamber due to the flow velocity difference.

In addition, since the air bubbles generated within the first liquid chamber or the second liquid chamber have less spatial restrictions and grow easily, there is a possibility that the abnormal noise generated at the time of collapse may increase.

The invention has been made in view of the above circumstances, and an object thereof is to provide a vibration isolating device that can keep air bubbles from being generated within a first liquid chamber or a second liquid chamber.

Solution to Problem

In order to solve the above problem, the invention suggests the following means.

a vibration isolating device according to the invention includes a tubular first attachment member that is coupled to any one of a vibration generating part and a vibration receiving part, and a second attachment member that is coupled to the other thereof; an elastic body that elastically couples both the attachment members to each other; and a partition member that partitions a liquid chamber within the first attachment member filled with a liquid into a first liquid chamber and a second liquid chamber. A liquid filled type vibration isolating device comprising: a restricted passage, which allows the first liquid chamber and the second liquid chamber to communicate with each other, is formed in the partition member. The restricted passage includes a first communication part opening to the first liquid chamber, a second communication part opening to the second liquid chamber, and a main flow passage that allows the first communication part and the second communication part to communicate with each other. At least one of the first communication part and the second communication part includes a plurality of pores that penetrate a first barrier facing the first liquid chamber or the second liquid chamber. At least one pore of the plurality of pores has a flow passage length of the pore that is 3 times or more a minimum value of an internal diameter of the pore.

Effects of Invention

According to the invention, the air bubbles can be kept from being generated within the first liquid chamber or the second liquid chamber.

DESCRIPTION OF EMBODIMENTS

Hereinafter, an embodiment of a vibration isolating device according to the invention will be described with reference to FIGS. 1 to 3.

Figure 1:
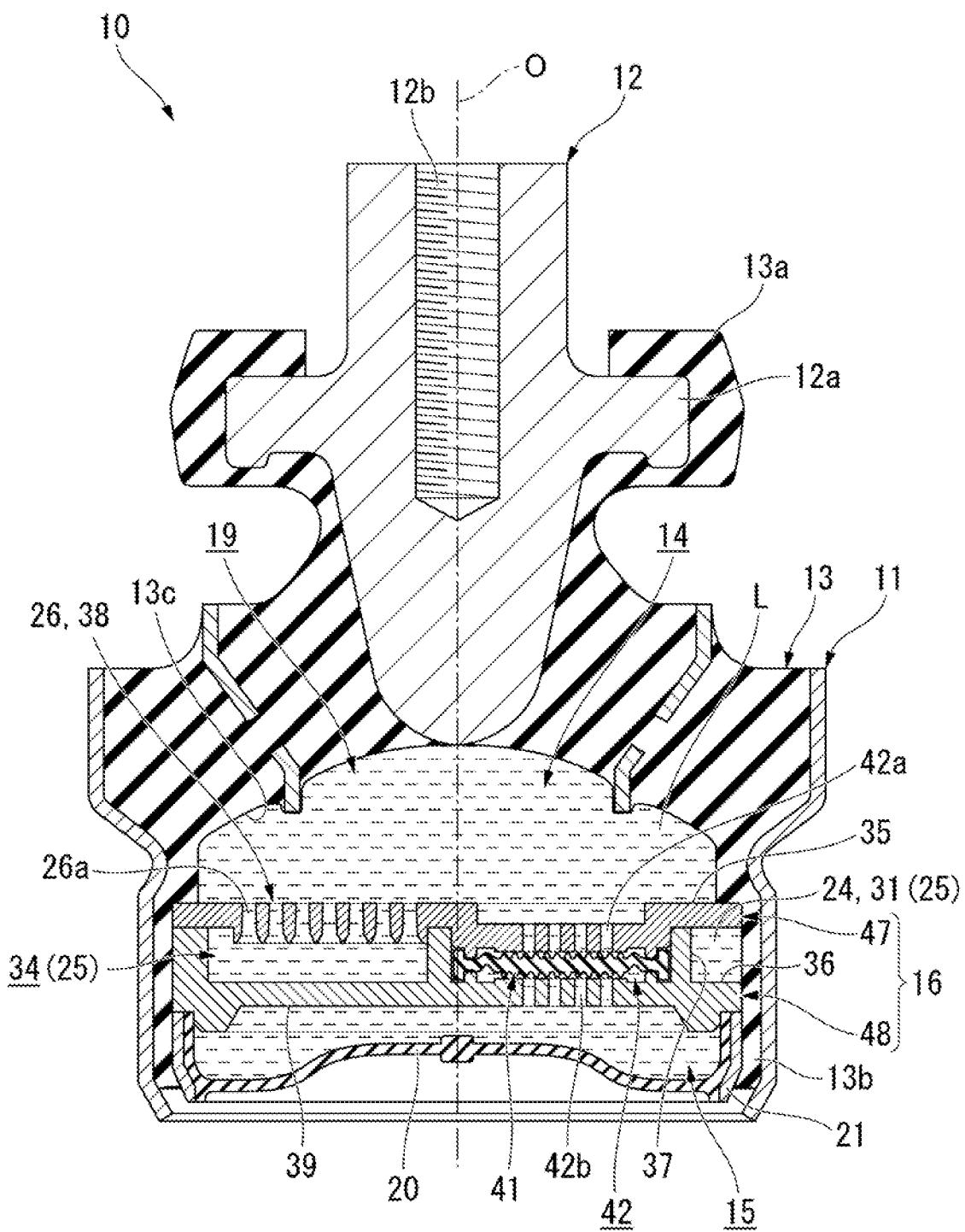
FIG. 1 is a longitudinal sectional view of a vibration isolating device according to an embodiment of the invention.

As shown in FIG. 1, the vibration isolating device 10 is a liquid filled type vibration isolating device including a tubular first attachment member 11 that is coupled to any one of a vibration generating part and a vibration receiving part, a second attachment member 12 that is coupled to the other of the vibration generating part and the vibration receiving part, an elastic body 13 that elastically couples the first attachment member 11 and the second attachment member 12 to each other, and a partition member 16 that partitions a liquid chamber 19 within the first attachment member 11 into a main liquid chamber (first liquid chamber) 14 and a secondary liquid chamber (second liquid chamber) 15 to be described below.

Hereinafter, the direction along the central axis O of the first attachment member 11 is referred to as an axial direction. Additionally, the second attachment member 12 side in the axial direction is referred to as an upper side, and the partition member 16 side is referred to as a lower side. Additionally, in a plan view of the vibration isolating device 10 from the axial direction, a direction intersecting the central axis O is referred to as a radial direction, and a direction around the central axis O is referred to as a circumferential direction.

In addition, the first attachment member 11, the second attachment member 12, and the elastic body 13 are formed in a circular shape or an annular shape in a state viewed from above, respectively, and are disposed coaxially with the central axis O.

In a case where the vibration isolating device 10 is mounted on, for example, an automobile, the second attachment member 12 is coupled to an engine serving as the vibration generating part, and the first attachment member 11 is coupled to a vehicle body serving as the vibration receiving part. Accordingly, the transmission of vibration of the engine to the vehicle body is suppressed. In addition, the first attachment member 11 may be coupled to the vibration generating part, and the second attachment member 12 may be coupled to the vibration receiving part.

The second attachment member 12 is a columnar member that extends in the axial direction and is formed in a hemispherical shape of which a lower end swells downward. A flange part 12a, which protrudes radially outward, is formed in the portion of the second attachment member 12 located above the hemispherical lower end. A screw hole 12b, which extends downward from an upper end surface of the second attachment member 12, is drilled in the second attachment member 12, and a bolt (not shown) serving as a fixture on the engine side is threadedly engaged with the screw hole 12b. The second attachment member 12 is disposed in an upper end opening of the first attachment member 11 via the elastic body 13.

The elastic body 13 is a rubber body that is vulcanized and bonded to the upper end opening of the first attachment member 11 and the lower outer peripheral surface of the second attachment member 12 and is interposed therebetween, and blocks the upper end opening of the first attachment member 11 from above. A first rubber film 13a, which integrally covers a lower surface an outer peripheral surface, and an upper surface in the flange part 12a, is integrally formed at an upper end of the elastic body 13. A second rubber film 13b, which liquid-tightly covers an inner peripheral surface of the first attachment member 11, is integrally formed at a lower end of the elastic body 13. In addition, as the elastic body 13, it is also possible to use an elastic body made of synthetic resin or the like other than rubber.

The first attachment member 11 is formed in a cylindrical shape and is coupled to the vehicle body or the like serving as the vibration receiving part via a bracket that is not shown. A lower end opening of the first attachment member 11 is blocked by a diaphragm 20.

The diaphragm 20 is made of elastic materials, such as rubber and soft resin, and is formed in a bottomed cylindrical shape. An outer peripheral surface of the diaphragm 20 is vulcanized and bonded to an inner peripheral surface of a diaphragm ring 21. The diaphragm ring 21 is fitted into a lower end of the first attachment member 11 via the second rubber film 13b. The diaphragm ring 21 is swaged and fixed within the lower end of the first attachment member 11. An upper end opening edge each of the diaphragm 20 and the diaphragm ring 21 liquid-tightly abuts against a lower surface of the partition member 16.

Also, by attaching the diaphragm 20 to the first attachment member 11 in this way, the inside of the first attachment member 11 serves as the liquid chamber 19 that is liquid-tightly sealed by the elastic body 13 and the diaphragm 20. Liquid L is filled (charged) in the liquid chamber 19.

In addition, in the shown example, a bottom part of the diaphragm 20 is a shape that is deep on an outer peripheral side thereof and shallow at a central part thereof. However, as the shape of the diaphragm 20, various shapes known in the related art can be adopted in addition to such a shape.

The liquid chamber 19 is partitioned into a main liquid chamber 14 and a secondary liquid chamber 15 by the partition member 16. The main liquid chamber 14 has the lower surface 13c of the elastic body 13 as a portion of a wall surface thereof, and is a space that is surrounded by the elastic body 13, the second rubber film 13b that liquid-tightly covers the inner peripheral surface of the first attachment member 11, and the partition member 16, and varies in internal volume depending on the deformation of the elastic body 13. The secondary liquid chamber 15 is a space that is surrounded by the diaphragm 20 and the partition member 16, and varies in internal volume depending of deformation of the diaphragm 20. The vibration isolating device 10 including such a configuration is a compression-type device that is attached and used such that the main liquid chamber 14 is located on an upper side in the vertical direction and the secondary liquid chamber 15 is located on a lower side in the vertical direction.

An accommodation chamber 42 in which a membrane 41 formed of, for example, a rubber material or the like is accommodated is formed inside the partition member 16. The membrane 41 is formed in a plate shape in which the front and back surfaces face in the axial direction. A plurality of first communication holes 42a which allow the accommodation chamber 42 and the main liquid chamber 14 to communicate with each other, and a plurality of second communication holes 42b which allow the accommodation chamber 42 and the secondary liquid chamber 15 to communicate with each other are formed in the partition member 16. The respective numbers of the first communication holes 42a and the second communication holes 42b are the same. The respective internal diameters of the first communication holes 42a and the second communication holes 42b are the same. The respective flow passage lengths of the first communication holes 42a and the second communication holes 42b are the same. The plurality of first communication holes 42a have the same shape and the same size. The plurality of second communication holes 42b have the same shape and the same size. The plurality of first communication holes 42a and the plurality of second communication holes 42b separately face each other in the axial direction with the membrane 41 and the accommodation chamber 42 interposed therebetween.

Figure 3:
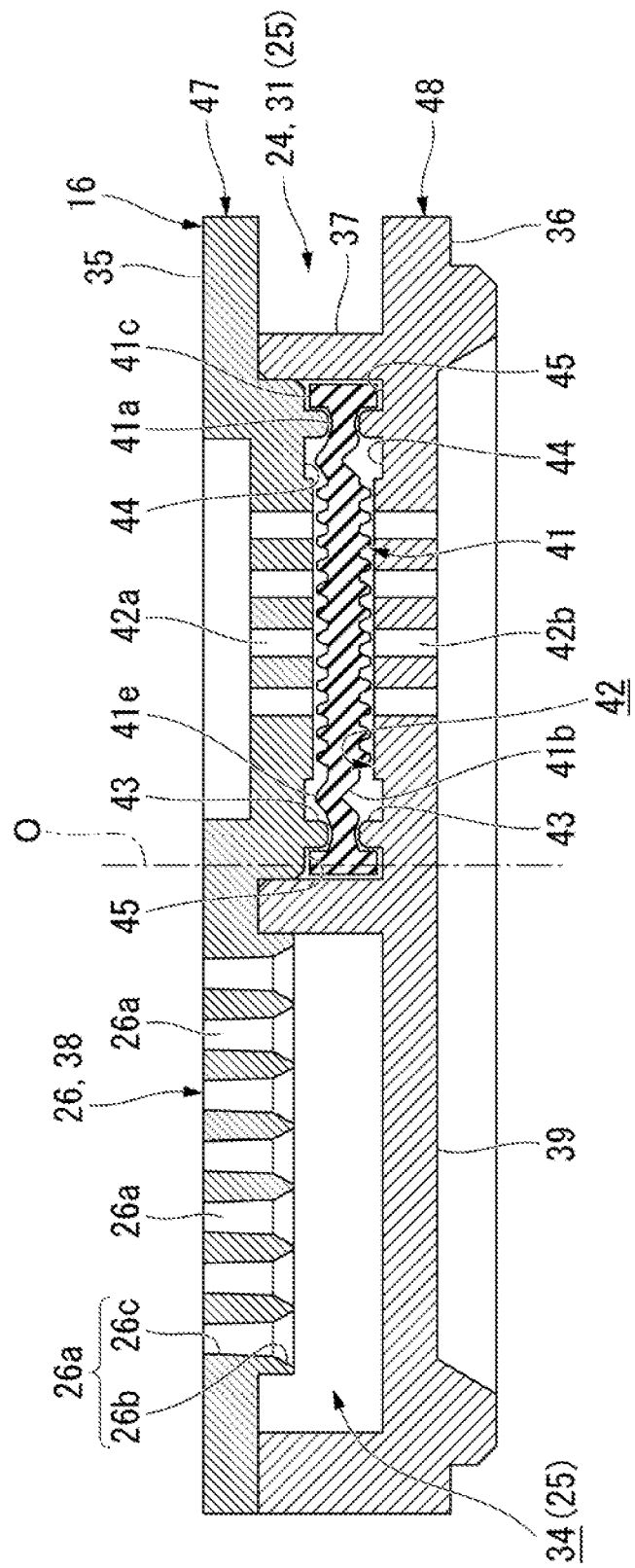
FIG. 3 is an enlarged longitudinal sectional view of the partition member shown in FIGS. 1 and 2.

As shown in FIG. 3, supporting parts 43, which support an outer peripheral edge 41a of the membrane 41 from both sides in the axial direction (thickness direction), are disposed in the accommodation chamber 42. The outer peripheral edge 41a of the membrane 41 is a flat surface of which front and back surfaces face in the axial direction. The supporting parts 43 are formed on both an upper wall surface, which is located on the upper side and faces downward, and a lower wall surface, which is located on the lower side and faces upward, among wall surfaces that define the accommodation chamber 42. Each supporting part 43 is formed in a protruding strip shape that extends in the circumferential direction and supports the outer peripheral edge 41a of the membrane 41 over the entire circumference. The supporting part 43 continuously supports the outer peripheral edge 41a of the membrane 41 over the entire circumference. In addition, the supporting parts 43 may abut against the outer peripheral edge 41a of the membrane 41 from both sides in the axial direction or may approach the outer peripheral edge 41a without abutment.

A locking projection 41c, which protrudes to both sides in the axial direction, is formed at the portion of the membrane 41 that is continuous with the outer peripheral edge 41a from the outside of the outer peripheral edge 41a. The locking projection 41c is continuously disposed along the outer peripheral edge 41a of the membrane 41 over the entire circumference thereof. Axially outer ends of the locking projection 41c are located on the outermost sides of the membrane 41 in the axial direction.

A locking groove 45 to which the locking projection 41c of the membrane 41 is locked is formed in a portion, which is continuous with each supporting part 43 from the outside of the accommodation chamber 42, in at least one of the upper wall surface and the lower wall surface that define the accommodation chamber 42. The locking groove 45 is continuously disposed along the outer peripheral surface of the supporting part 43 over the entire circumference thereof. The locking grooves 45 are formed in both the upper wall surface and the lower wall surface in the accommodation chamber 42, and the locking grooves 45 face each other in the axial direction. The locking groove 45 is disposed at an outer peripheral edge in the accommodation chamber 42.

Figure 2:
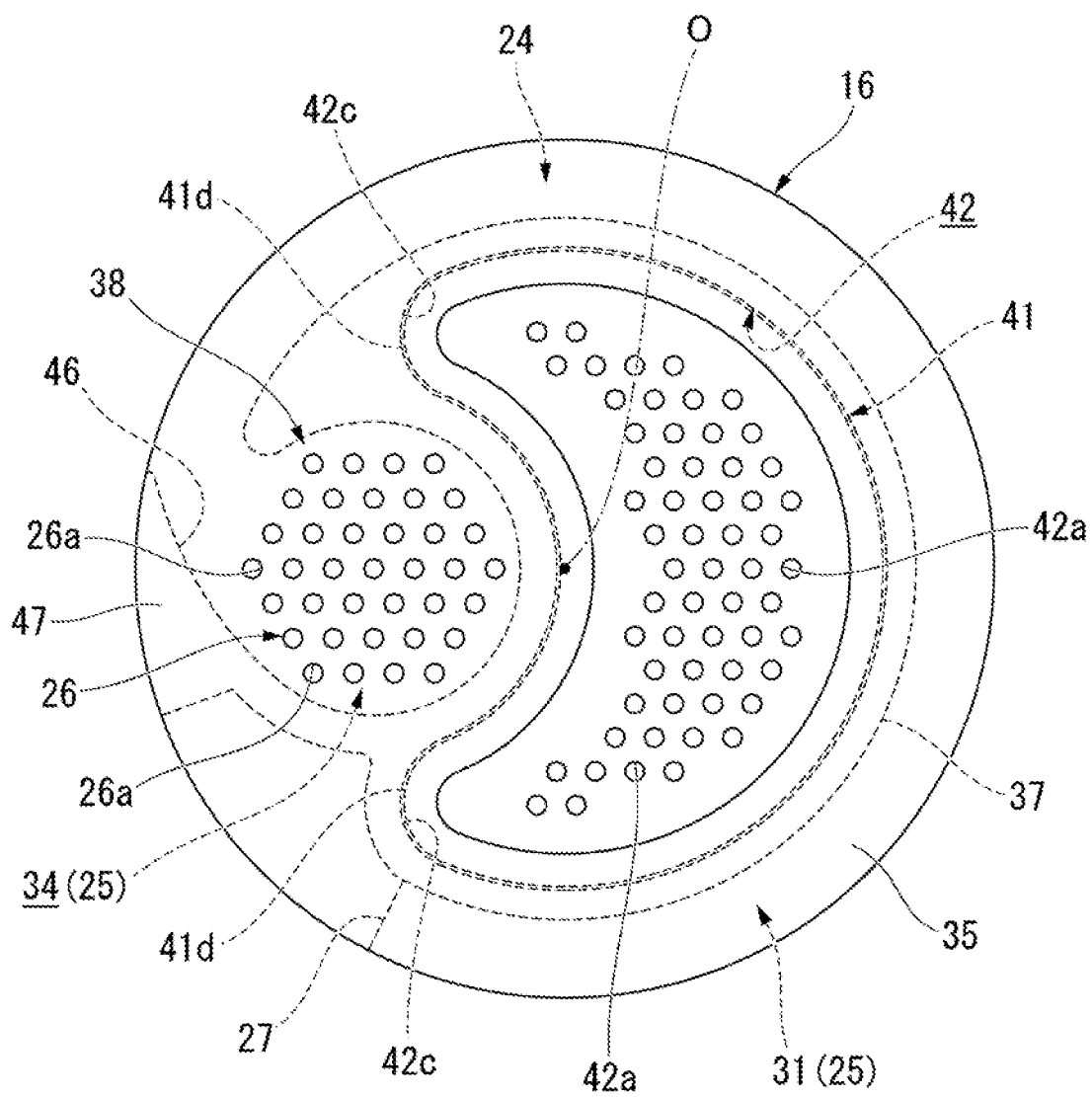
FIG. 2 is a top view of a partition member that constitutes the vibration isolating device shown in FIG. 1.

In a plan view as viewed from the axial direction, as shown in FIG. 2, the membrane 41 and the accommodation chamber 42 are formed in the same shape and the same size. Corners 41d and 42c, which are pointed outward in the plan view, are formed in the membrane 41 and the accommodation chamber 42. The corners 41d and 42c have a curved shape that is pointed outward in the plan view as viewed from the axial direction. The corners 41d and 42c are pointed outward with respect to the respective centroids of the membrane 41 and the accommodation chamber 42 in the plan view as viewed from the axial direction.

In the shown example, in the plan view as viewed from the axial direction, the membrane 41 and the accommodation chamber 42 has a crescent shape including an inner peripheral edge, an outer peripheral edge that surrounds the inner peripheral edge from a radially outer side, and the corners 41d and 42c that separately couple both ends of the inner peripheral edge and both ends of the outer peripheral edge to each other. In the plan view, outer peripheral edges of the membrane 41 and the accommodation chamber 42 extend in the circumferential direction and are located at an outer peripheral part of the partition member 16, and central parts at inner peripheral edges of the membrane 41 and the accommodation chamber 42 are located at a central part of the partition member 16.

In addition, the plan-view shapes of the membrane 41 and the accommodation chamber 42 may be appropriately changed to, for example, an angular shape or a star shape.

As is shown in FIGS. 2 and 3, an expandibly and contractibly deformable expansion/contraction part 41b is formed in the portion of the membrane 41 continuous with at least the portion of the outer peripheral edge 41a located at the corner 41d, from the inside of the outer peripheral edge 41a. The expansion/contraction part 41b is bent in a thickness direction of the membrane 41. The expansion/contraction part 41b includes an apex 41e that is pointed toward a wall surface that defines the accommodation chamber 42. One expansion/contraction part 41b is formed in the membrane 41 and is bent upward. The apex 41e is pointed toward the upper wall surface of the accommodation chamber 42.

In the shown example, the expansion/contraction part 41b is continuously disposed along the outer peripheral edge 41a of the membrane 41 over the entire circumference thereof.

In addition, a plurality of the expansion/contraction parts 41b may be disposed in series on the membrane 41 to form a bellows shape. Additionally, the expansion/contraction part 41b may be bent downward. Additionally, for example, the expansion/contraction part 41b may be disposed only at the portion of the membrane 41 continuous with the portion of the outer peripheral edge 41a located at the corner 41d, from the inside of this outer peripheral edge 41a.

Here, a plurality of projections are provided on upper and lower surfaces of a body part, which is located inside the expansion/contraction part 41b, in the membrane 41. Instead of the shown example, for example, the expansion/contraction part 41b may be formed to have a smaller thickness than the thickness of the portion the body part of the membrane 41 excluding the plurality of projections and may be formed in a flat plate shape that extends in a direction orthogonal to the axial direction.

An escape recess 44 is formed in the portion, which faces the apex 41e of the expansion/contraction part 41b, in a wall surface that defines the accommodation chamber 42. In the shown example, the apex 41e of the expansion/contraction part 41b faces the upper wall surface of the accommodation chamber 42. The escape recesses 44 are formed in both the upper wall surface and the lower wall surface of the accommodation chamber 42, and the respective escape recesses 44 face each other in the axial direction. In addition, the escape recess 44 may be formed only in the upper wall surface of the accommodation chamber 42. The escape recess 44 faces in the axial direction over the entire region of the expansion/contraction part 41b in the width direction.

The escape recess 44 is formed at a portion, which is continuous with the supporting part 43 from the inside of the accommodation chamber 42, in each of the upper wall surface and the lower wall surface of the accommodation chamber 42. The escape recess 44 is continuously disposed along the inner peripheral surface of the supporting part 43 over the entire circumference thereof. The groove width of the escape recess 44 is larger than the groove width of the locking groove 45. The respective depths of the escape recess 44 and the locking groove 45 are equal to each other.

The partition member 16 is provided with a restricted passage 24 that allows the main liquid chamber 14 and the secondary liquid chamber 15 to communicate with each other. As shown in FIG. 2, the restricted passage 24 includes a first communication part 26 opening to the main liquid chamber 14, a second communication part 27 opening to the secondary liquid chamber 15, and a main flow passage 25 that allows the first communication part 26 and the second communication part 27 to communicate with each other.

The main flow passage 25 includes a main flow passage 31 that extends from any one of the first communication part 26 and the second communication part 27 toward one side in the circumferential direction, and a vortex chamber 34 that protrudes axially inward from one circumferential end of the main flow passage 31 and forms a swirling flow of a liquid according to the flow velocity of the liquid from one of the first communication part 26 and the second communication part 27.

In the shown example, the main flow passage 31 extends from the second communication part 27 toward the one side in the circumferential direction. The vortex chamber 34 and the first communication part 26 are directly connected to each other.

The main flow passage 31 is formed in an outer peripheral surface of the partition member 16. The main flow passage 31 is disposed in an angular range of less than 360° around the central axis O in the partition member 16. In the shown example, the main flow passage 31 is disposed in an angular range exceeding 180° around the central axis O in the partition member 16.

The main flow passage 31 is defined by a lower surface of an annular upper barrier 35 that is disposed coaxially with the central axis O and is located on the upper side and of which front and back surfaces face in the axial direction, an upper surface of an annular lower barrier 36 that is disposed coaxially with the central axis O and is located on the lower side and of which front and back surfaces face the axial direction, and a groove bottom surface 37 that couples respective inner peripheral edges of the upper barrier 35 and the lower barrier 36 to each other and faces the radially outer side.

The upper barrier 35 faces the main liquid chamber 14. The lower barrier 36 faces the secondary liquid chamber 15, and the second communication part 27 is formed by one opening that penetrates the lower barrier 36 in the axial direction.

The vortex chamber 34 has a circular shape in the plan view as viewed from the axial direction, and a central axis of the vortex chamber 34 extends in the axial direction. The vortex chamber 34 is disposed at a position away from the central axis O. The vortex chamber 34 is disposed side by side with the accommodation chamber 42 in the direction orthogonal to the axial direction and does not communicate with the accommodation chamber 42 inside the partition member 16. The internal volume and the plane area of the vortex chamber 34 are smaller than the internal volume and the plane area of the accommodation chamber 42.

In the plan view as viewed from the axial direction, at least a portion of the vortex chamber 34 is located between the two corners 41d and 42c in each of the membrane 41 and the accommodation chamber 42. In the shown example, the portion of the vortex chamber 34 located on a radially inner side is located between the two corners 41d and 42c in each of the membrane 41 and the accommodation chamber 42.

The vortex chamber 34 generates a swirling flow of the liquid L that flows from the second communication part 27 to the first communication part 26 and is directed from the other side to the one side in the circumferential direction according to the flow velocity of the liquid L. The vortex chamber 34 forms the swirling flow of the liquid L according to the flow velocity of the liquid L that flows in from an external communication part 46 to be described below. For example, when the flow velocity of the liquid L that flows into the vortex chamber 34 is low, the swirling of the liquid L within the vortex chamber 34 is suppressed. However, when the flow velocity of the liquid L is high, the swirling flow of the liquid L is formed within the vortex chamber 34. The swirling flow swirls around the central axis of the vortex chamber 34.

The external communication part 46 extends linearly in the plan view. The external communication part 46 extends in a tangential direction of an inner peripheral surface of the vortex chamber 34 in the plan view. The circumferential size of the external communication part 46 is smaller than the internal diameter of the vortex chamber 34. The axial size of the external communication part 46 and the axial size of the vortex chamber 34 are equal to each other. The liquid L, which flows into the vortex chamber 34 from the external communication part 46, flows through the external communication part 46, is straightened in the tangential direction, and then swirls by flowing along the inner peripheral surface of the vortex chamber 34.

Among wall surfaces that define the vortex chamber 34, an upper wall surface, which is located on the upper side and faces the lower side, is a lower surface of a first barrier 38 of which an upper surface faces the main liquid chamber 14, and a lower wall surface, which is located on the lower side and faces the upper side, is an upper surface of a second barrier 39 of which a lower surface faces the secondary liquid chamber 15. The lower surface of the first barrier 38 and the upper surface of the second barrier 39 are flat surfaces that extend in the direction orthogonal to the axial direction. The first barrier 38 and the second barrier 39 have a disk shape disposed coaxially with the central axis of the vortex chamber 34.

The first communication part 26 includes a plurality of pores 26a that penetrate the first barrier 38 facing the main liquid chamber 14. Each pore 26a penetrates the first barrier 38 in the axial direction. In addition, the pore 26a may be formed in the lower barrier 36 that faces the secondary liquid chamber 15 and may be provided in the second communication part 27.

As shown in FIG. 3, the pore 26a includes a first portion 26b on the main flow passage 25 side and a second portion 26c on the main liquid chamber 14 side. The flow passage length of the first portion 26b is shorter than the flow passage length of the second portion 26c. Each of the first portion 26b and the second portion 26c gradually decreases in diameter from the main flow passage 25 side toward the main liquid chamber 14. The inclination angle of an inner peripheral surface of the first portion 26b with respect to the axial direction is larger than the inclination angle of an inner peripheral surface of the second portion 26c with respect to the axial direction. The first portion 26b and the second portion 26c are connected to each other without a step. The internal diameter of the pore 26a is maximum at an opening end on the main flow passage 25 side and is minimum at an opening end on the main liquid chamber 14 side.

Each of the plurality of pores 26a is smaller than the flow passage cross-sectional area of the main flow passage 31 and is disposed inside the vortex chamber 34 in the plan view as viewed from the axial direction. The plurality of pores 26a have the same shape and the same size. The minimum value of the internal diameter of each pore 26a is smaller than the respective internal diameters of the first communication holes 42a and the second communication holes 42b, and the maximum value of the internal diameter of each pore 26a is larger than the respective internal diameters of the first communication holes 42a and the second communication holes 42b. The average value of the internal diameter of each pore 26a is smaller than the respective internal diameters of the first communication holes 42a and the second communication holes 42b.

The total of the minimum values of the flow passage cross-sectional areas in the plurality of pores 26a is smaller than the total of the flow passage cross-sectional areas of the plurality of first communication holes 42a and the total of the flow passage cross-sectional areas of the plurality of second communication holes 42b. The flow passage cross-sectional areas of the first communication holes 42a and the second communication holes 42b are equal over the entire length.

The total of the minimum values of the flow passage cross-sectional areas in the plurality of pores 26a may be, for example, 1.5 times or more and 4.0 times or less the minimum value of the flow passage cross-sectional area of the main flow passage 31. In the shown example, the flow passage cross-sectional area of the main flow passage 31 is equal over the entire length. The minimum value of the flow passage cross-sectional areas of each pore 26a may be, for example, 25 mm$^2$ or less, and preferably 0.7 mm$^2$ or more and 17 mm$^2$ or less.

Also, in the present embodiment, at least one pore of the plurality of pores 26a have a flow passage length of the pore that is 3 times or more the minimum value of the internal diameter of the pore. Preferably, in at least half of the plurality of pores 26a, the flow passage length of the pores is 3 times or more the minimum value of the internal diameter of the pores. In the shown example, for all of the plurality of pores 26a, the flow passage length of the pores is 3 times or more the minimum value of the internal diameter of the pores.

In addition, in a case where some of the plurality of pores 26a are different in size from the others, the average value of the flow passage lengths of the plurality of pores 26a is 2.5 times or more and 4.5 times or less the average value of the minimum values of the internal diameters in the plurality of pores 26a while including at least one pore 26a in which the flow passage length of the pore is 3 times or more the minimum value of the internal diameter of the pore. Preferably, in a case where some of the plurality of pores 26a are different in size from the others, the average value of the flow passage lengths of the plurality of pores 26a is 3 times or more the average value of the minimum values of the internal diameters in the plurality of pores 26a.

Additionally, the flow passage length of at least one among the plurality of pores 26a is larger than the respective flow passage lengths of the first communication holes 42a and the second communication holes 42b. In the shown example, the flow passage length of all the plurality of pores 26a is larger than the respective flow passage lengths of the first communication holes 42a and the second communication holes 42b.

Among the upper barrier 35 and the first barrier 38 that define the restricted passage 24 and faces the main liquid chamber 14 and the lower barrier 36 and the second barrier 39 that define the restricted passage 24 and faces the secondary liquid chamber 15, the thickness of the first barrier 38 in which the plurality of pores 26a are formed is larger than the respective thicknesses of the upper barrier 35, the lower barrier 36, and the second barrier 39. The thickness of the first barrier 38 in which the plurality of pores 26a are located is equal over the entire region. The upper surface and the lower surface of the first barrier 38 are flat surfaces that extend in the direction orthogonal to the axial direction.

Here, the partition member 16 is configured such that the upper member 47 and the lower member 48 overlap each other in the axial direction. The upper member 47 and the lower member 48 are formed in a plate shape of which front and back surfaces face in the axial direction. In addition, the partition member 16 may be integrally formed as a whole.

An outer peripheral surface of the lower member 48 is a groove bottom surface 37. A first recess which defines the accommodation chamber 42 together with the lower surface of the upper member 47, and a second recess which defines the vortex chamber 34 together with a lower surface of the upper member 47 are formed in an upper surface of the lower member 48. The second communication holes 42b are formed in a bottom surface of the first recess. A bottom wall of the second recess is the second barrier 39. The annular lower barrier 36, which protrudes radially outward and in which the second communication part 27 is formed, is formed on an outer peripheral surface of a lower end of the lower member 48.

An outer peripheral edge of the upper member 47, which faces the lower barrier 36 of the lower member 48 in the axial direction, is the upper barrier 35. The first communication holes 42a are formed in the portion of the upper member 47 that faces the first recess of the lower member 48 in the axial direction. The first communication part 26 is formed in the portion of the upper member 47 that faces the second recess of the lower member 48 in the axial direction, and this portion is the first barrier 38.

In the vibration isolating device 10 having such a configuration, when vibration is input, both the attachment members 11 and 12 are relatively displaced while elastically deforming the elastic body 13. Then, the liquid pressure of the main liquid chamber 14 fluctuates, the liquid L within the main liquid chamber 14 flows into the secondary liquid chamber 15 through the restricted passage 24, and the liquid L within the secondary liquid chamber 15 flows into the main liquid chamber 14 through the restricted passage 24.

As described above, according to the vibration isolating device 10 related to the present embodiment, when the liquid L flows into the main liquid chamber 14 through the plurality of pores 26a from the restricted passage 24, the liquid L flows through the respective pores 26a while the pressure loss is caused by the first barrier 38 in which the pores 26a are formed. Therefore, the flow velocity of the liquid L, which flows into the main liquid chamber 14, can be suppressed. Moreover, since the liquid L flows through the plurality of pores 26a instead of a single pore 26a, it is possible to branch the liquid L into a plurality of spots to make the liquid flow therethrough, and the flow velocity of the liquid L, which has passed through the individual pore 26a, can be reduced. Accordingly, even if a large load (vibration) is input to the vibration isolating device 10, it is possible to keep a flow velocity difference caused between the liquid L that has flowed into the main liquid chamber 14 through the pores 26a, and the liquid L within the main liquid chamber 14 low, and generation of a vortex resulting from the flow velocity difference and generation of air bubbles resulting from this vortex can be suppressed.

Additionally, even if the air bubbles are generated not in the main liquid chamber 14 but in the restricted passage 24, the liquid L is made to pass through the plurality of pores 26a within the main liquid chamber 14. Accordingly, it is possible to separate the generated air bubbles from each other, and the air bubbles can be easily maintained in a state where the air bubbles are kept from merging and growing up and the air bubbles are finely dispersed.

As described above, as well as the generation itself of the air bubbles can be suppressed, even if the air bubbles are generated, the air bubbles can be easily maintained in a state where the air bubbles are finely dispersed. Thus, even if cavitation collapse in which the air bubbles collapse occurs, the abnormal noise to be generated can be kept low.

Particularly, since the flow passage length of at least one pore of the plurality of pores 26a is 3 times or more the minimum value of the internal diameter of the pore 26a, it is possible to increase the pressure loss of the liquid L passing through the pores 26a, and the flow velocity of the liquid L, which flows into the main liquid chamber 14 from the restricted passage 24 through the pores 26a can be reliably suppressed. Hence, it is possible to reliably keep the aforementioned flow velocity difference small, and the air bubbles can be reliably kept from being generated within the main liquid chamber 14 due to the flow velocity difference.

Additionally, the thickness of the first barrier 38 is larger than the respective thicknesses of the upper barrier 35, the lower barrier 36, and the second barrier 39. Thus, by forming a number of the pores 26a in the first barrier 38, the first barrier 38 can be kept from being easily damaged even if the pressure loss occurring in the liquid L that flows into the main liquid chamber 14 through the plurality of pores 26a from the restricted passage 24 is high. Hence, the vibration isolating device 10, which can reliably suppress the generation of air bubbles while ensuring durability, is obtained.

Additionally, since the flow passage length of at least one pore of the plurality of pores 26a is larger than the respective flow passage lengths of the first communication holes 42a and the second communication holes 42b, it is possible to reliably increase the pressure loss of the liquid L passing through the pores 26a, and the air bubbles can be much more reliably kept from being generated within the main liquid chamber 14 due to the aforementioned flow velocity difference.

Next, a verification test on the functions and effects described above will be described.

In the vibration isolating device 10 shown in FIGS. 1 to 3, three types of vibration isolating devices in which only the thickness of the first barrier 38 and the length of the pores 26a were changed and all the other regions were made the same were prepared, and shock waves resulting from the cavitation collapse occurred when sign wave vibration in the axial direction was applied to the respective vibration isolating devices were measured by an acceleration sensor mounted on the first attachment member.

In the respective vibration isolating devices, after the minimum value of the internal diameter of Pores 26a was set to 1.6 mm, the flow passage length of the pores 26a was changed to 3.0 mm (1.9 times the minimum value of the internal diameter), 5.0 mm (3.1 times the minimum value of the internal diameter), and 7.0 mm (4.4 times of the minimum value of the internal diameter).

As a result, in a case where the acceleration measured by a vibration isolating device in which the flow passage length of the pores 26a is 3.0 mm was 100%, it was confirmed that the acceleration is about 32% in a vibration isolating device in which the flow passage length of the pores 26a is 5.0 mm and the acceleration is about 8% in a vibration isolating device in which the flow passage length of the pores 26a is 7.0 mm.

As described above, if the flow passage length of the pores 26a is 3 times or more the minimum value of the internal diameter of the pores 26a, it was confirmed that the generation of the abnormal noise resulting from the cavitation collapse can be reliably suppressed.

In addition, the technical scope of the invention is not limited to the above embodiment, and various changes can be made without departing the spirit of the invention.

For example, in the above embodiment, a configuration in which the front and back surfaces of the membrane 41 is directed to the axial direction has been shown. However, the membrane 41 may be disposed in a state where the front and back surfaces are directed to the radial direction or the like.

Additionally, a configuration in which both the first communication part 26 and the second communication part 27 have the pores 26a may be adopted.

Additionally, although a configuration in which the partition member 16 makes one round has been shown as the main flow passage 31, a configuration in which the partition member 16 goes longer than one round may be adopted.

Additionally, the main flow passage 31 may be appropriately changed, such as extending in the axial direction.

Additionally, the supporting part 43, the escape recess 44, and the locking groove 45 may not be formed in the accommodation chamber 42.

Additionally, the accommodation chamber 42 may not be formed in the partition member 16.

Additionally, a configuration having no vortex chamber 34 may be adopted as the main flow passage 25.

Additionally, the thickness of the first barrier 38 in which the plurality of pores 26a are formed may be equal to or less than the respective thicknesses of the upper barrier 35, the lower barrier 36, and the second barrier 39.

Additionally, the flow passage length of the pores 26a may be equal to or less than the respective flow passage lengths of the first communication holes 42a and the second communication holes 42b.

Additionally, in the above embodiment, the compression type vibration isolating device 10 in which the positive pressure acts on the main liquid chamber 14 as the support load acts has been described. However, the invention is also applicable to a hanging-type vibration isolating device that is attached such that the main liquid chamber 14 is located on the lower side in the vertical direction and the secondary liquid chamber 15 is located on the upper side in the vertical direction and in which the negative pressure acts on the main liquid chamber 14 as the support load acts.

Additionally, In the above embodiment, the partition member 16 partitions the liquid chamber 19 within the first attachment member 11 into the main liquid chamber 14 having the elastic body 13 as a portion of a wall surface thereof, and the secondary liquid chamber 15. However, the invention is not limited to this. For example, a pair of the elastic bodies 13 may be provided in the axial direction instead of providing the diaphragm 20, and a pressure-receiving liquid chamber having the elastic body 13 as a portion of a wall surface thereof may be provided instead of providing the secondary liquid chamber 15. For example, the invention can be appropriately changed to another configuration in which the partition member 16 partitions the liquid chamber 19 within the first attachment member 11 in which the liquid L is filled into the first liquid chamber 14 and the second liquid chamber 15, and at least one of both the liquid chambers of the first liquid chamber 14 and the second liquid chamber 15 has the elastic body 13 as a portion of a wall surface thereof.

Additionally, the vibration isolating device 10 according to the invention is not limited to an engine mount of a vehicle and can also be applied to those other than the engine mount. For example, the vibration isolating devices are also applicable to mounts of power generators loaded on construction machines or are also applicable to mounts of machines installed in factories or the like.

According to the invention, when vibration is input, both the attachment members are relatively displaced while elastically deforming the elastic body, the liquid pressure of the first liquid chamber and the second liquid chamber fluctuates, and the liquid tends to flow between the first liquid chamber and the second liquid chamber through the restricted passage. In this case, the liquid flows into the restricted passage through one of the first communication part and the second communication part, passes through the main flow passage, and then, flows out of the restricted passage through the other of the first communication part and the second communication part.

Here, when the liquid flows into the first liquid chamber or the second liquid chamber through the plurality of pores from the restricted passage, the fluid flows through the respective pores while the pressure loss is caused by the first barrier in which the pores are formed. Therefore, the flow velocity of the liquid, which flows into the first liquid chamber or the second liquid chamber, can be suppressed. Moreover, since the liquid flows through the plurality of pores instead of a single pore, it is possible to branch the liquid into a plurality of spots to make the liquid flow therethrough, and the flow velocity of the liquid, which has passed through the individual pore, can be reduced. Accordingly, even if a large load (vibration) is input to the vibration isolating device, it is possible to keep a flow velocity difference caused between the liquid that has flowed into the first liquid chamber or the second liquid chamber through the pores, and the liquid within the first liquid chamber or the second liquid chamber low, and generation of a vortex resulting from the flow velocity difference and generation of air bubbles resulting from this vortex can be suppressed. Additionally, even if the air bubbles are generated not in the first liquid chamber or the second liquid chamber but in the restricted passage, the liquid is made to pass through the plurality of pores. Accordingly, it is possible to separate the generated air bubbles from each other within the first liquid chamber or the second liquid chamber, the air bubbles can be easily maintained in a state where the air bubbles are kept from merging and growing up and the air bubbles are finely dispersed.

As described above, as well as the generation itself of the air bubbles can be suppressed, even if the air bubbles are generated, the air bubbles can be easily maintained in a state where the air bubbles are finely dispersed. Thus, even if cavitation collapse in which the air bubbles collapse occurs, the abnormal noise to be generated can be kept low.

Particularly, since the flow passage length of at least one pore of the plurality of pores is 3 times or more the minimum value of the internal diameter of the pore, it is possible to increase the pressure loss of the liquid passing through the pores, and the flow velocity of the liquid, which flows into the first liquid chamber or the second liquid chamber through the pores from the restricted passage can reliably be suppressed. Hence, it is possible to reliably keep the aforementioned flow velocity difference small, and the air bubbles can be reliably kept from being generated within the first liquid chamber or the second liquid chamber due to the flow velocity difference.

Here, the thickness of the first barrier out of the barrier, which defines the restricted passage and faces the first liquid chamber, and the barrier, which defines the restricted passage and faces the second liquid chamber, may be larger than the thickness of the other portions.

In this case, the thickness of the first barrier of the respective barriers may be larger than the thickness of the other portions. Thus, by forming a number of the pores in the first barrier, the first barrier can be kept from being easily damaged even if the pressure loss occurring in the liquid that flows into the first liquid chamber or the second liquid chamber through the plurality of pores from the restricted passage is high. Hence, the vibration isolating device, which can reliably suppress the generation of air bubbles while ensuring durability, is obtained.

Additionally, an accommodation chamber in which a membrane is accommodated, a first communication hole which allows the accommodation chamber and the first liquid chamber to communicate with each other, and a second communication hole which allows the accommodation chamber and the second liquid chamber to communicate with each other are formed in the partition member, and the flow passage length of at least one pore of the plurality of pores may be larger than the respective flow passage lengths of the first communication hole and the second communication hole.

In this case, since the flow passage length of at least one of the plurality of pores is larger than the respective flow passage lengths of the first communication holes and the second communication holes, it is possible to reliably increase the pressure loss of the liquid passing through the pores, and the air bubbles can be much more kept from being generated within the first liquid chamber or the second liquid chamber due to the aforementioned flow velocity difference.

In addition, it is possible to appropriately replace the constituent elements in the above-described embodiment with well-known constituent elements without departing from the spirit of the invention. Additionally, the above-described modification examples may be appropriately combined.

INDUSTRIAL APPLICABILITY

According to the invention, the air bubbles can be kept from being generated within the first liquid chamber or the second liquid chamber.

REFERENCE SIGNS LIST

10: vibration isolating device
11: first attachment member
12: second attachment member
13: elastic body
14: main liquid chamber (first liquid chamber)
15: secondary liquid chamber (second liquid chamber)
16: partition member
19: liquid chamber
24: restricted passage
25: main flow passage
26: first communication part
26a: pore
27: second communication part
35: upper barrier
36: lower barrier
38: first barrier
39: second barrier
41: membrane
42: accommodation chamber
42a: first communication hole
42b: second communication hole
L: liquid
O: central axis

What is claimed is:

1. A liquid filled type vibration isolating device comprising:
a tubular first attachment member that is coupled to any one of a vibration generating part and a vibration receiving part, and a second attachment member that is coupled to the other thereof;
an elastic body that elastically couples both the attachment members to each other; and
a partition member that partitions a liquid chamber within the first attachment member filled with a liquid into a first liquid chamber and a second liquid chamber,
wherein a restricted passage, which is configured to allow the first liquid chamber and the second liquid chamber to communicate with each other, is formed in the partition member,
wherein the restricted passage includes a first communication part opening to the first liquid chamber, a second communication part opening to the second liquid chamber, and a main flow passage that allows the first communication part and the second communication part to communicate with each other,
wherein at least one of the first communication part and the second communication part includes a plurality of pores that penetrate a first barrier facing the first liquid chamber or the second liquid chamber,
wherein at least one pore of the plurality of pores has a flow passage length of the pore that is 3 times or more than a minimum value of an internal diameter of the pore,
wherein the pore includes a first portion on the main flow passage side and a second portion on the first liquid chamber side, and
wherein an inclination angle of an inner peripheral surface of the first portion with respect to an axial direction is larger than an inclination angle of an inner peripheral surface of the second portion with respect to the axial direction.

2. A liquid filled type vibration isolating device comprising:
a tubular first attachment member that is coupled to any one of a vibration generating part and a vibration receiving part, and a second attachment member that is coupled to the other thereof;
an elastic body that elastically couples both the attachment members to each other; and
a partition member that partitions a liquid chamber within the first attachment member filled with a liquid into a first liquid chamber and a second liquid chamber,
wherein a restricted passage, which is configured to allow the first liquid chamber and the second liquid chamber to communicate with each other, is formed in the partition member,
wherein the restricted passage includes a first communication part opening to the first liquid chamber, a second communication part opening to the second liquid chamber, and a main flow passage that allows the first communication part and the second communication part to communicate with each other,
wherein at least one of the first communication part and the second communication part includes a plurality of pores that penetrate a first barrier facing the first liquid chamber or the second liquid chamber,
wherein at least one pore of the plurality of pores has a flow passage length of the pore that is 3 times or more than a minimum value of an internal diameter of the pore,
wherein an accommodation chamber in which a membrane is accommodated, a first communication hole which is configured to allow the accommodation chamber and the first liquid chamber to communicate with each other, and a second communication hole which is configured to allow the accommodation chamber and the second liquid chamber to communicate with each other are formed in the partition member,
wherein a flow passage length of at least one pore of the plurality of pores is larger than each of flow passage lengths of the first communication hole and the second communication hole, and
wherein a minimum value of an internal diameter of each pore of the plurality of pores is smaller than the respective internal diameters of the first communication holes and the second communication holes, and a maximum value of an internal diameter of each pore of the plurality of pores is larger than the respective internal diameters of the first communication holes and the second communication holes.

3. A liquid filled type vibration isolating device comprising:
a tubular first attachment member that is coupled to any one of a vibration generating part and a vibration receiving part, and a second attachment member that is coupled to the other thereof;
an elastic body that elastically couples both the attachment members to each other; and
a partition member that partitions a liquid chamber within the first attachment member filled with a liquid into a first liquid chamber and a second liquid chamber,
wherein a restricted passage, which is configured to allow the first liquid chamber and the second liquid chamber to communicate with each other, is formed in the partition member,
wherein the restricted passage includes a first communication part opening to the first liquid chamber, a second communication part opening to the second liquid chamber, and a main flow passage that allows the first communication part and the second communication part to communicate with each other,
wherein at least one of the first communication part and the second communication part includes a plurality of pores that penetrate a first barrier facing the first liquid chamber or the second liquid chamber,
wherein at least one pore of the plurality of pores has a flow passage length of the pore that is 3 times or more than a minimum value of an internal diameter of the pore,
wherein an accommodation chamber in which a membrane is accommodated, a first communication hole which is configured to allow the accommodation chamber and the first liquid chamber to communicate with each other, and a second communication hole which is configured to allow the accommodation chamber and the second liquid chamber to communicate with each other are formed in the partition member,
wherein a flow passage length of at least one pore of the plurality of pores is larger than each of flow passage lengths of the first communication hole and the second communication hole, and
wherein a total of minimum values of flow passage cross-sectional areas in the plurality of pores is smaller than a total of the flow passage cross-sectional areas of the plurality of first communication holes and a total of the flow passage cross-sectional areas of the plurality of second communication holes.

\* \* \* \* \*